US012596298B2

(12) United States Patent
Kim et al.

(10) Patent No.: US 12,596,298 B2
(45) Date of Patent: Apr. 7, 2026

(54) CAMERA MODULE

(71) Applicant: SAMSUNG ELECTRO-MECHANICS CO., LTD., Suwon-si (KR)

(72) Inventors: Jung Woo Kim, Suwon-si (KR); You Jin Jeong, Suwon-si (KR); Sot Eum Seo, Suwon-si (KR); Soo Cheol Lim, Suwon-si (KR); Kum Kyung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 249 days.

(21) Appl. No.: 18/342,358

(22) Filed: Jun. 27, 2023

(65) Prior Publication Data

US 2024/0201573 A1      Jun. 20, 2024

(30) Foreign Application Priority Data

Dec. 15, 2022    (KR) ........................ 10-2022-0175997

(51) Int. Cl.
G03B 30/00        (2021.01)
H04N 23/57        (2023.01)
(52) U.S. Cl.
CPC ............. G03B 30/00 (2021.01); H04N 23/57 (2023.01)
(58) Field of Classification Search
CPC .......... G03B 30/00; G03B 17/17; G03B 5/00; G03B 13/36; G03B 17/12; G03B 2217/002; H04N 23/57; H04N 23/00; H04N 23/55
See application file for complete search history.

(56) References Cited

U.S. PATENT DOCUMENTS

| | | | |
|---|---|---|---|
| 8,639,106 B1 | 1/2014 | Gleason et al. | |
| 2007/0064320 A1* | 3/2007 | Homme | G03B 3/10 |
| | | | 359/824 |
| 2020/0137274 A1* | 4/2020 | Lee | G03B 17/17 |
| 2020/0348479 A1 | 11/2020 | Kwon et al. | |
| 2021/0199983 A1 | 7/2021 | Kazuo | |

(Continued)

FOREIGN PATENT DOCUMENTS

| | | |
|---|---|---|
| JP | 5997993 B2 | 9/2016 |
| KR | 10-2002-0092677 A | 12/2002 |
| KR | 10-2020-0126873 A | 11/2020 |

(Continued)

OTHER PUBLICATIONS

Korean Office Action issued on Jan. 18, 2025, in corresponding Korean Patent Application No. 10-2022-0175997. (6pages in English, 5pages in Korean).

*Primary Examiner* — Timothy J Henn
(74) *Attorney, Agent, or Firm* — NSIP Law

(57) ABSTRACT

A camera module includes a first lens module including one or more lenses disposed along a first optical axis; a housing defining an internal space; at least two guide portions disposed in the internal space to guide a coupling position of the first lens module; and a reflection module disposed in the internal space to change a traveling path of light incident along the first optical axis. The at least two guide portions include a first guide portion contacting the first lens module to form a first number of contact points and a second guide portion contacting the first lens module to form a second number of contact points different from the first number of contact points.

17 Claims, 14 Drawing Sheets

(56) References Cited

U.S. PATENT DOCUMENTS

2022/0279093  A1     9/2022  Kwon et al.

FOREIGN PATENT DOCUMENTS

| KR | 10-2226523 | B1 |   | 3/2021 | | |
|----|------------|----|---|--------|---|---|
| KR | 10-2021-0077656 | A |   | 6/2021 | | |
| KR | 10-2309464 | B1 |   | 10/2021 | | |
| KR | 10-2022-0010979 | A |   | 1/2022 | | |
| WO | WO-2008090561 | A2 | * | 7/2008 | ............ | G02B 7/102 |

* cited by examiner

100

2000

1300

1200

1100

5000

I

I'

Z

X          Y

A

B

I-I'

II-II'

CAMERA MODULE

CROSS-REFERENCE TO RELATED APPLICATION(S)

This application claims the benefit under 35 USC 119(a) of Korean Patent Application No. 10-2022-0175997 filed on Dec. 15, 2022 in the Korean Intellectual Property Office, the entire disclosure of which is incorporated herein by reference for all purposes.

BACKGROUND

The following description relates to a camera module.

A camera module provided in a mobile device is manufactured to have performance comparable to that of a conventional camera. In particular, as the frequency of capturing images using a mobile device increases, demand for a camera module capable of providing a high zoom magnification increases.

To configure a high zoom magnification, it is necessary to sufficiently secure a distance that light incident on the camera travels to the image sensor, for example, a full length or a total track length (TTL). However, as mobile devices are gradually miniaturized, there may be space limitations to sufficiently increase the overall length or total track length of the camera module.

A recent camera module has had a reflector inside or outside the camera that may bend the path of light so as to make the light path as long as possible, so that the light path is long without significantly increasing the overall length of the camera.

However, in the camera module having such a reflector, there is a problem in that the optical axis between the lens modules is shifted due to an external impact of the camera module or a manufacturing tolerance of the camera module, so that the resolution of the camera module is lowered.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first lens module including one or more lenses disposed along a first optical axis; a housing defining an internal space; at least two guide portions disposed in the internal space and configured to guide a coupling position of the first lens module; and a reflection module disposed in the internal space and configured to change a traveling path of light incident along the first optical axis. The at least two guide portions include a first guide portion contacting the first lens module to form a first number of contact points and a second guide portion contacting the first lens module to form a second number of contact points different from the first number of contact points.

The first guide portion may form at least three contact points with the first lens module, and the second guide portion may form at least two contact points with the first lens module.

The first guide portion and the second guide portion may protrude from the housing toward the first lens module.

The first lens module may include a first guide groove contacting the first guide portion and a second guide groove contacting the second guide portion.

The first guide groove may have at least three inclined surfaces inclined in different directions, and the second guide groove may have at least two inclined surfaces inclined in different directions.

The camera module may include a second lens module accommodated in the housing and having a second optical axis, which intersects the first optical axis.

The camera module may include a plurality of ball members disposed between the second lens module and the housing, and the housing may include a plurality of third guide grooves in which the plurality of ball members are respectively accommodated.

The second lens module may include a fourth guide groove and a fifth guide groove respectively facing the plurality of third guide grooves, the fourth guide groove may form at least two contact points with at least one of the plurality of ball members, and the fifth guide groove may form at least one contact point with at least one of the plurality of ball members.

The camera module may include a shield can coupled to the housing and covering the internal space of the housing, and the shield can may include a first opening through which light emitted from the first lens module passes.

The first guide portion and the second guide portion may protrude from the housing toward the first lens module, and the shield can may include a second opening that does not coincide with the first guide portion and the second guide portion.

The camera module may include a cover covering a gap between the shield can and the first lens module.

The reflection module may include: a rotating holder configured to rotate about a first rotational axis parallel to the first optical axis; and a reflective member supported by the rotating holder and configured to rotate about a second rotational axis, which is perpendicular to the first rotational axis.

The reflective member may include a reflective surface configured to reflect the light incident along the first optical axis, and the first optical axis and the second optical axis may be configured to cross each other on the reflective surface.

In another general aspect, a camera module includes a first lens module including one or more lenses disposed along a first optical axis; a reflection module configured to change a path of light passing through the first lens module; a housing in which the reflection module is accommodated; and a plurality of guide grooves disposed in either the first lens module or the housing and configured to guide a coupling position of the first lens module. The plurality of guide grooves include: a first guide groove having at least three inclined surfaces inclined in different directions; and a second guide groove having at least two inclined surfaces inclined in different directions.

The camera module may include a plurality of guide protrusions disposed on the other one of the first lens module or the housing and contacting the first guide groove and the second guide groove.

The camera module may include a second lens module including one or more lenses disposed along a second optical axis, which intersects the first optical axis, the first lens module may be coupled to an upper surface of the housing, and the second lens module may be accommodated in the housing.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
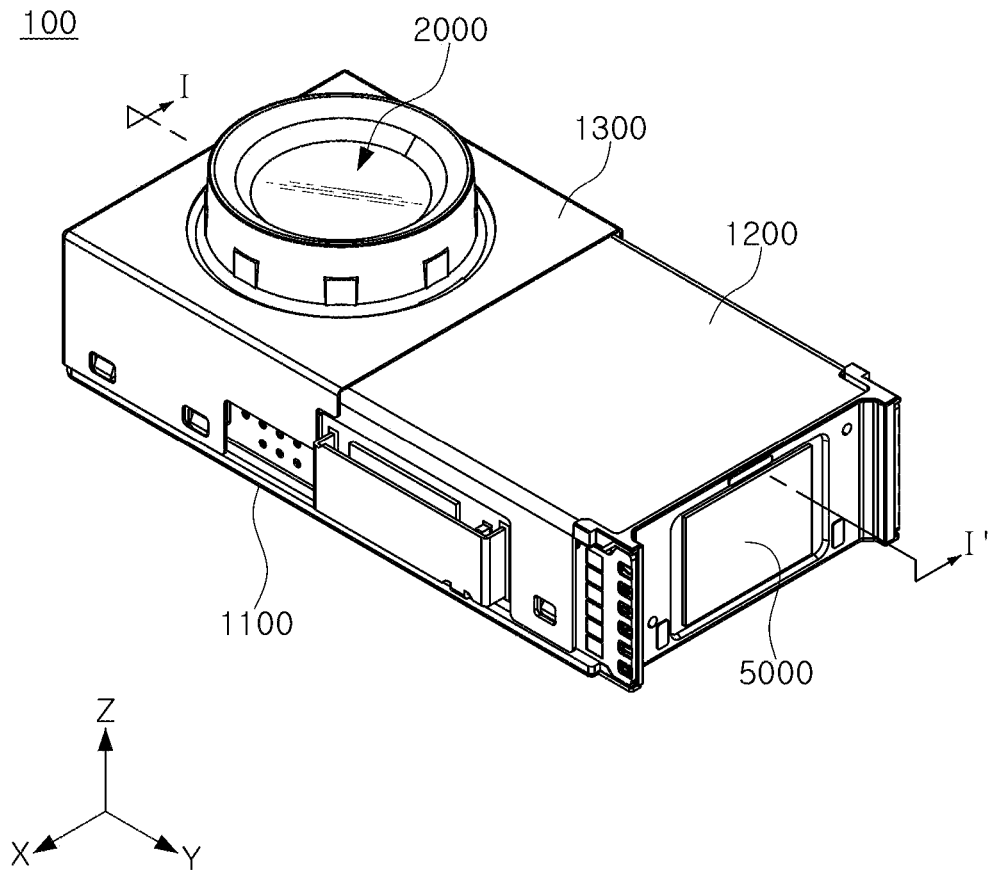
FIG. 1 is a perspective view of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on,"

"connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element.

Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
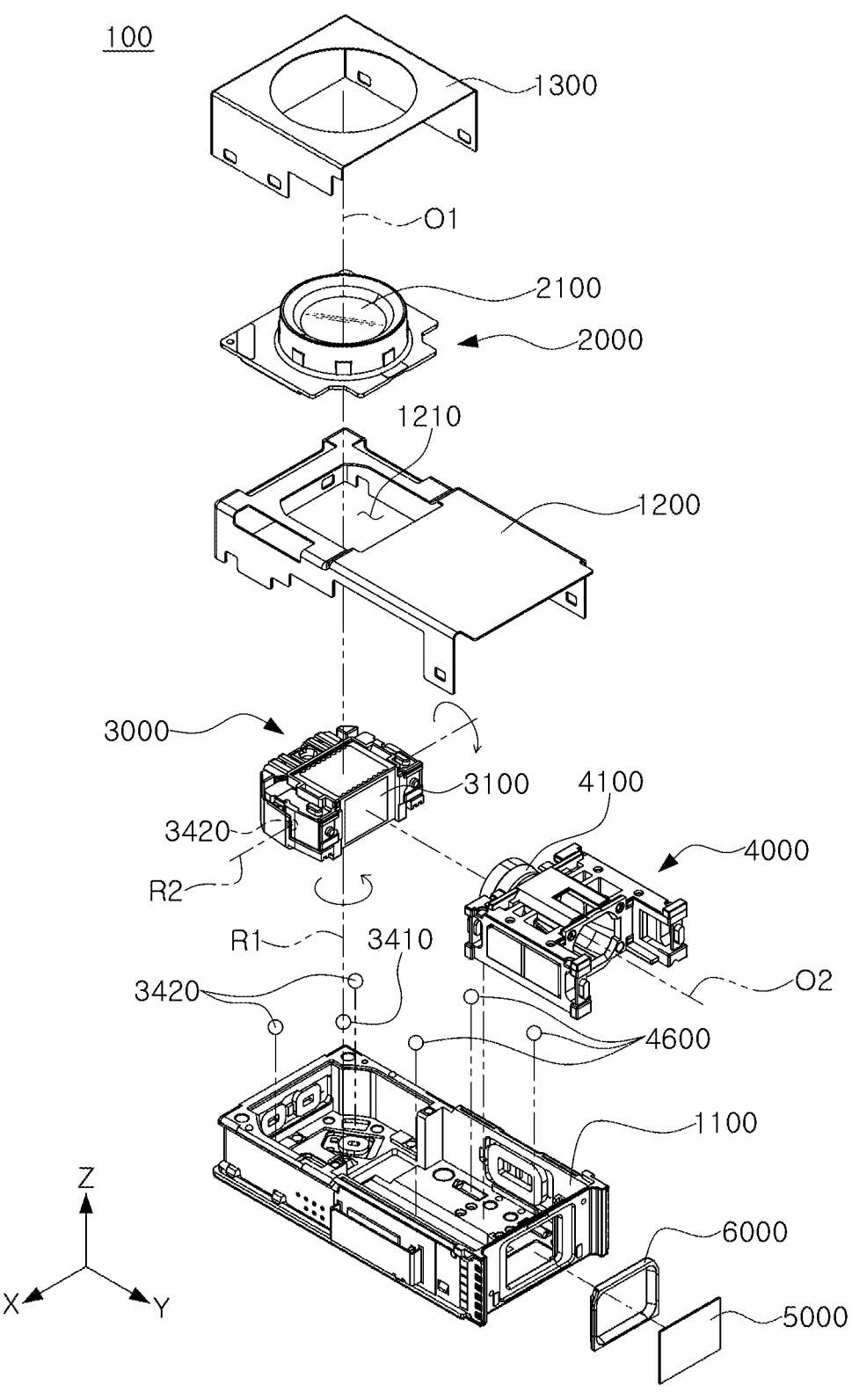
FIG. 2 is an exploded perspective view of a camera module.
Figure 3:
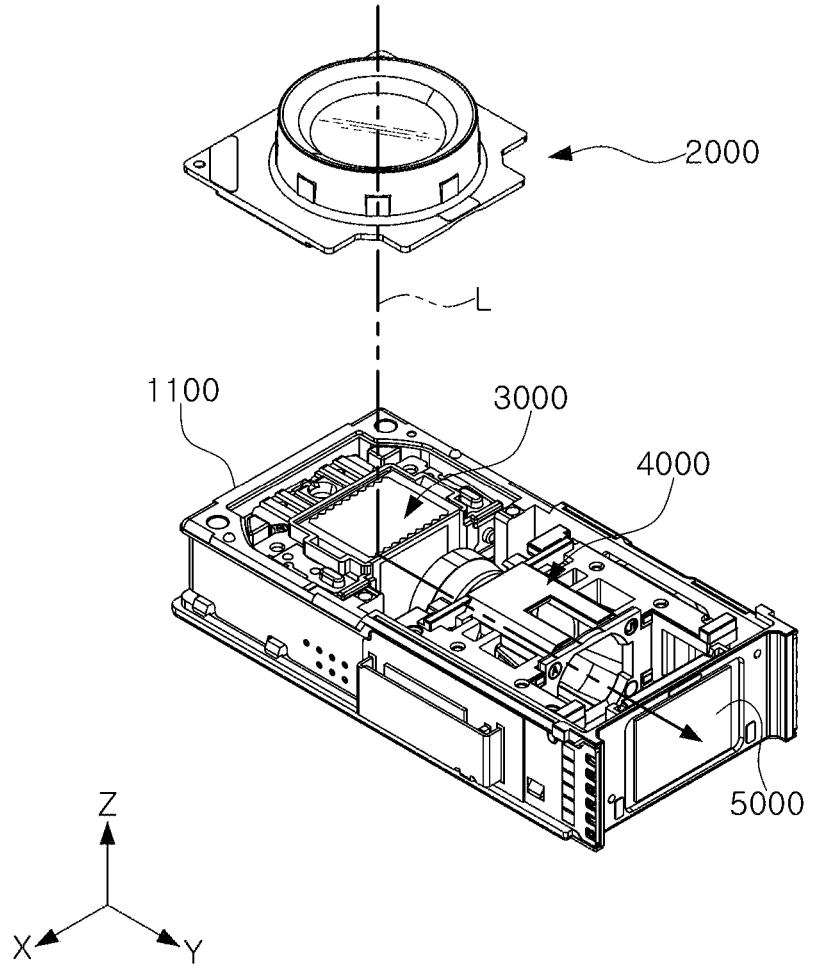
FIG. 3 illustrates a disposition relationship among a first lens module, a reflection module, and a second lens module.

FIG. 1 is a perspective view of a camera module 100. FIG. 2 is an exploded perspective view of the camera module 100. FIG. 3 illustrates a disposition relationship among a first lens module 2000, a reflection module 3000, and a second lens module 4000.

Referring to FIGS. 1 to 3, the camera module 100 may include a housing 1100, the reflection module 3000, a plurality of lens modules 2000 and 4000, and an image sensor 5000.

The camera module 100 may include a plurality of lens modules 2000 and 4000. The plurality of lens modules 2000 and 4000 may include a first lens module 2000 and a second lens module 4000 having different optical axes. Light incident from an external subject to the camera module 100 may be incident to the image sensor 5000 via the first lens module 2000 and the second lens module 4000.

An optical axis O1 (hereinafter, first optical axis O1) of the first lens module 2000 and an optical axis O2 (hereinafter, second optical axis O2) of the second lens module 4000 may not be parallel to each other. For example, the first lens module 2000 and the second lens module 4000 may be disposed so that the first optical axis O1 and the second optical axis 02 intersect.

The first optical axis O1 and the second optical axis O2 may be substantially perpendicular, but the angle therebetween is not limited thereto.

Lenses included in the first lens module 2000 or the second lens module 4000 may be configured to be movable relative to the image sensor 5000. For example, lenses 2100 included in the first lens module 2000 may be configured to move along the first optical axis O1. Alternatively, lenses included in the second lens module 4000 may be configured to move along the second optical axis O2. As the lens included in each of the lens modules 2000 and 4000 moves, an optical image stabilization (OIS) function or an autofocus function (AF) of the camera module 100 may be performed. For example, the camera module 100 may perform an autofocus function by moving the lens of the second lens module 4000 in the direction of the second optical axis O2.

Alternatively, the position of at least one of the lenses included in the first lens module 2000 or the second lens module 4000 may be fixed relative to the housing 1100. For example, in the camera module 100, a lens 2100 included in the first lens module 2000 is fixed to the housing 1100, and a lens included in the second lens module 4000 may be configured to be movable in a direction parallel to or perpendicular to the second optical axis O2.

In the camera module 100, the reflection module 3000 may be disposed to change a traveling direction of light emitted from the first lens module 2000 to a direction parallel to the second optical axis O2. For example, referring to FIG. 2, the reflection module 3000 changing a propagation path of light may be disposed between the first lens module 2000 and the second lens module 4000. For example, the camera module 100 may include the reflection module 3000 disposed on an optical path from the first lens module 2000 to the second lens module 4000.

The reflection module 3000 is accommodated in the internal space of the housing 1100 and may change the path of light incident to the reflection module 3000. In this case, the reflection module 3000 will be understood as a concept including at least a portion of a reflective member 3100 changing a path of light, components supporting and driving the reflective member 3100, and the housing 1100 accommodating the same.

The reflective member 3100 of the reflection module 3000 is configured to change a traveling path by refracting or reflecting light, and may be, for example, a prism or a mirror changing an optical path by refracting or reflecting light.

The reflective member 3100 may change the traveling path of light emitted from the first lens module 2000 toward the second lens module 4000. For example, the reflective member 3100 may change a traveling path of light incident along the first optical axis O1 to a direction substantially parallel to the second optical axis O2. Accordingly, as illustrated in FIG. 3, the incident light (L) incident from the outside of the camera module 100 to the first lens module 2000 passes through the reflection module 3000 and changes the traveling path of light, and may enter the second lens module 4000. The incident light L may be properly refracted while passing through the second lens module 4000 and then be incident to the image sensor 5000.

The reflective member 3100 may be configured to be rotatable or movable within the housing 1100. According to the rotation or movement of the reflective member 3100, the path of the light L may be appropriately changed. The camera module 100 may perform an optical image stabilization (OIS) function by rotating or moving the reflective member 3100.

The reflective member 3100 may have a plurality of rotational axes and be configured to be rotatable in different directions. For example, the reflective member 3100 may rotate about a first rotational axis R1 parallel to the first optical axis O1, or the reflective member 3100 may rotate about a second rotational axis R2, perpendicular to both the first optical axis O1 and the second optical axis O2. Due to this rotation, the reflective member 3100 may change the traveling path of light to be substantially parallel to the second optical axis O2.

In the following description, the first rotational axis may be simply referred to as a 'first axis' and the second rotational axis may be briefly referred to as a 'second axis.' For example, unless otherwise indicated as 'optical axis,' 'first axis and second axis' may be understood as 'first rotational axis and second rotational axis' of the reflection module 3000.

In addition, an axis perpendicular to both the first rotational axis and the second rotational axis is defined as a 'third axis.' For example, the second optical axis O2 may be substantially parallel to the third axis.

The camera module 100 may include the image sensor 5000 into which light passing through the reflection module 3000 and the plurality of lens modules 2000 and 4000 is incident. The image sensor 5000 may convert incident light into image information. The image sensor 5000 may have a light collection surface facing the emission surface of the second lens module 4000 and generate an electrical signal corresponding to light incident from the second lens module 4000.

The image sensor 5000 may be accommodated inside the housing 1100 or disposed outside the housing 1100.

A filter unit 6000 filtering at least a portion of light incident from the lens module 4000 may be disposed in front of the image sensor 5000. The filter unit 6000 may include an optical filter (e.g., an infrared cut filter) capable of blocking light of a specific wavelength. Alternatively, the filter unit 6000 may include a light blocking member (baffle) that blocks at least a portion of light incident from the lens module.

Although not illustrated in FIG. 2, to configure a longer light path, the camera module 100 may further include another reflection module disposed between the lens module and the image sensor 5000 to change the light path.

The housing 1100 may have an internal space in which at least one of the reflection module 3000, the plurality of lens modules 2000 and 4000, and the image sensor 5000 may be accommodated. The housing 1100 may be made of a material having a predetermined rigidity to protect components accommodated therein. The housing 1100 may be a boxshaped member with an open top. However, the material and shape of the housing 1100 are not limited thereto.

The camera module 100 may include a shield can 1200 covering an upper portion of the housing 1100. The shield can 1200 may cover the open top of the housing 1100 to protect components inside the housing 1100 from the external environment.

The shield can 1200 may include a first opening 1210 through which incident light passes. For example, as illustrated in FIG. 2, the shield can 1200 may include a first opening 1210 disposed between the first lens module 2000 and the reflection module 3000. Light emitted from the first lens module 2000 may be incident to the reflection module 3000 on a lower end of the first lens module 2000 through the first opening 1210.

In the camera module 100 according to the various examples, some of the plurality of lens modules 2000 and 4000 may be disposed outside the housing 1100, and other parts may be disposed inside the housing 1100. For example, as illustrated in FIG. 2 or 3, the first lens module 2000 may be coupled to the outside of the housing 1100 and positioned above the reflection module 3000. The second lens module 4000 may be disposed inside the housing 1100. In this case, an exit surface of a lens included in the first lens module 2000 may be disposed to face an incident surface of the reflective member 3100 included in the reflection module 3000.

The first lens module 2000 outside the housing 1100 and the second lens module 4000 inside the housing 1100 may have optical axes O1 and O2 crossing each other. The reflection module 3000 is disposed between the first lens module 2000 and the second lens module 4000 to change the path of light traveling in the direction of the first optical axis O1 to the direction of the second optical axis O2. As the plurality of lens modules 2000 and 4000 are disposed to have optical axes O1 and O2 intersecting with each other, the overall length of the camera module 100 may be reduced further than the case in which the plurality of lens modules 2000 and 4000 are arranged side by side along the same optical axis.

In the case in which some lens modules are disposed outside the housing 1100, the camera module 100 may further include a configuration for structural or optical stability of the lens modules disposed outside the housing 1100. For example, the camera module 100 may further include a cover 1300 capable of shielding a separation space between the first lens module 2000 and the housing 1100.

In FIGS. 1 to 3, the second lens module 4000 and the reflection module 3000 are housed in one housing 1100, but this is merely an example. For example, each of the lens modules 2000 and 4000 and the reflection module 3000 may be accommodated in a plurality of housings, provided with different parts, and then assembled together to form the entire camera module 100. The image sensor 5000 may also be provided in a housing separate from the reflection module 3000 or the lens modules 2000 and 4000. In this case, the individual parts may be defined as a lens module assembly, a reflection module assembly, and an image sensor assembly, respectively. For example, the camera module 100 may include a reflection module assembly including the reflection module 3000, a lens module assembly including one or more lens modules 2000 and 4000, and an image sensor assembly.

Figure 4:
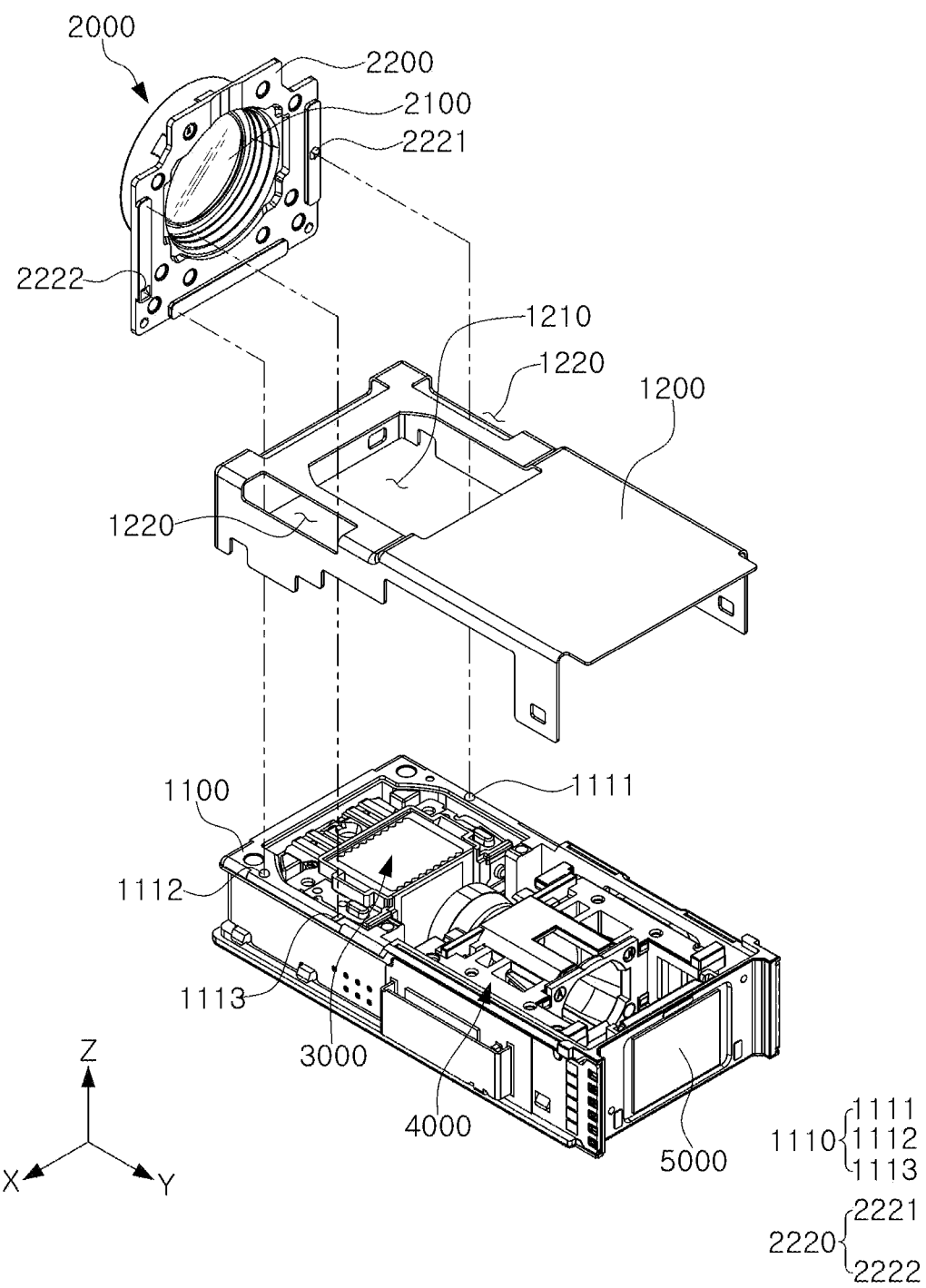
FIG. 4 is a reference view illustratively illustrating a state in which a first lens module is coupled to a housing.
Figure 5:
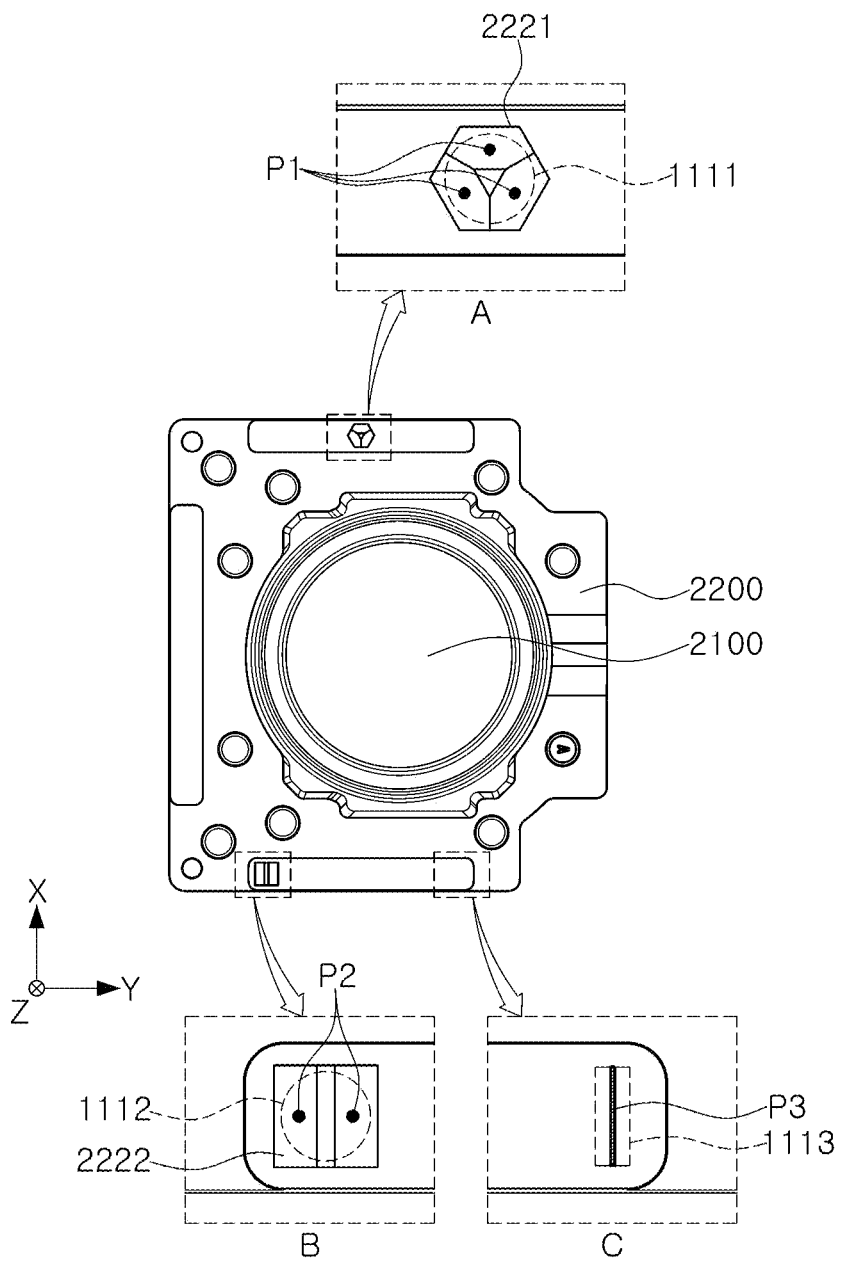
FIG. 5 is a bottom view of the first lens module.

FIG. 4 is a reference view exemplarily illustrating a state in which the first lens module 2000 is coupled to the housing 1100. FIG. 5 is a bottom view of the first lens module 2000.

Figure 6:
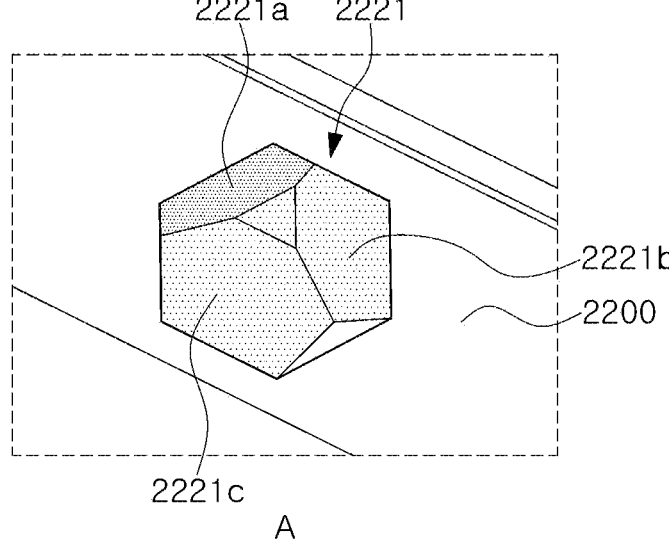
FIG. 6 is a view of parts A and B of FIG. 5 viewed from different angles.
Figure 6:
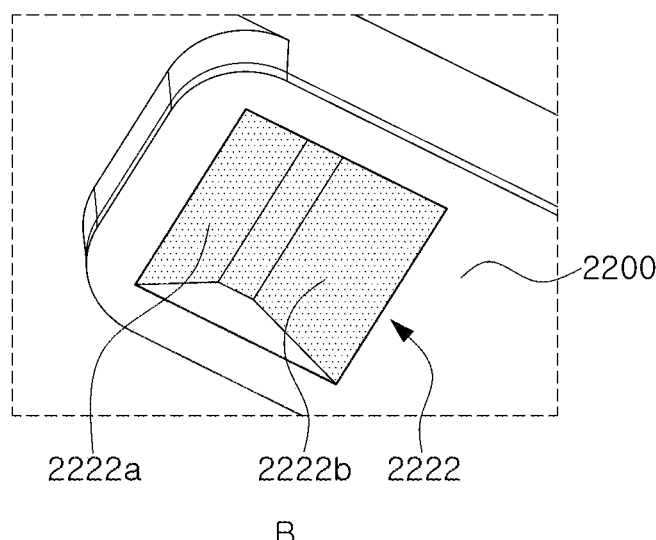
Figure 7:
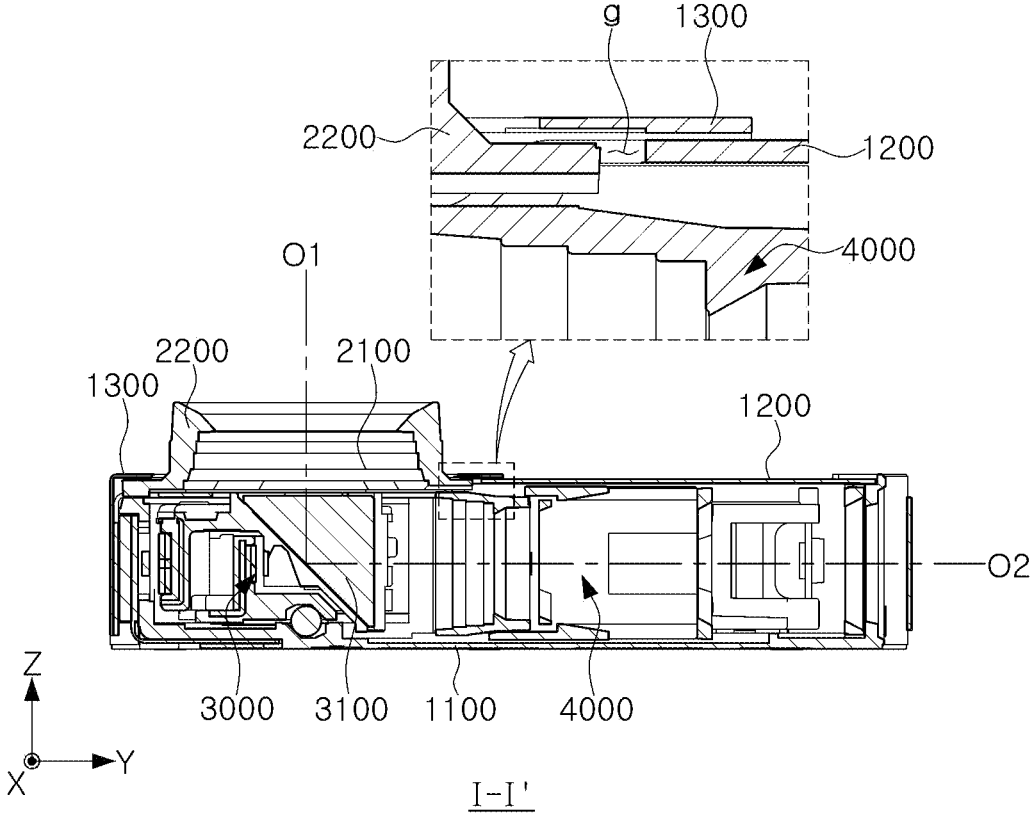
FIG. 7 is a cross-sectional view of part I-I' of FIG. 1.

FIG. 6 is a view of parts A and B of FIG. 5 viewed from different angles. FIG. 7 is a cross-sectional view of part I-I' of FIG. 1.

The first lens module 2000 described in FIGS. 4 to 7 and the camera module 100 including the same correspond to the first lens module 2000 and the camera module 100 described in FIGS. 1 to 3 above. Therefore, redundant descriptions may be omitted.

The first lens module 2000 may include one or more lenses 2100 disposed along the first optical axis O1 and a first lens holder 2200 accommodating the lenses 2100. Light introduced from an external subject may be refracted by the lens 2100 of the first lens module 2000 and then incident to the reflection module 3000.

In the camera module 100, the first lens module 2000 may be disposed in front of the reflection module 3000. An exit surface of the lens 2100 included in the first lens module 2000 may be disposed in a direction toward the reflective member 3100. Accordingly, the first lens module 2000 may emit light received from an external subject to the reflection module 3000.

The first lens module 2000 may be disposed such that the first optical axis O1 passes through the reflective member 3100 of the reflection module 3000.

The first lens module 2000 may be disposed outside the housing 1100 in which the reflection module 3000 is accommodated. For example, referring to FIG. 4, the first lens module 2000 may be coupled to an upper portion of the housing 1100 in which the reflection module 3000 is accommodated. However, unlike what is illustrated in the drawings, the first lens module 2000 may be disposed in front of the reflection module 3000 inside the housing 1100 in which the reflection module 3000 is accommodated.

In the camera module 100 according to the various examples, as the first lens module 2000 and the second lens module 4000 are spaced apart from each other with the reflection module 3000 interposed therebetween, the first optical axis O1 and the second optical axis O2 may be misaligned with each other. In addition, there is a concern that the first lens module 2000 may not be assembled in an accurate position due to tolerances generated during the manufacturing and assembling process of the camera module 100. In a case in which the first optical axis O1 and the second optical axis O2 are misaligned, or in a case in which the first lens module 2000 is not disposed in an accurate position, a phenomenon in which the resolution of the camera module 100 is deteriorated may occur or there is a concern that noise may be generated in image information acquired through the camera module 100. Accordingly, a structure capable of assembling the first lens module 2000 in the most accurate position is required despite tolerances that are unavoidably generated during the manufacturing process.

To this end, the camera module 100 may include guide protrusions 1110 and guide grooves 2220 that accurately guide the assembly position of the first lens module 2000. For example, as illustrated in FIG. 4, a plurality of guide protrusions 1110 and guide grooves 2220 capable of guiding an accurate assembly position of the first lens module 2000 may be disposed on the coupling surface of the housing 1100 and the first lens module 2000.

The guide protrusions 1110 and guide grooves 2220 may include a guide protrusion disposed on one of the housing 1100 and the first lens module 2000, and a guide groove disposed in the other one of the housing 1100 and the first lens module 2000. For example, the housing 1100 may be provided with a guide protrusion having a protrusion shape.

Also, the first lens module 2000 may be provided with a guide groove having a shape of a groove in which a guide protrusion may be accommodated.

However, contrary to this, it is also possible that a guide groove is disposed in the housing 1100, and a guide protrusion is disposed in the first lens module 2000.

The guide protrusion 1110 may protrude in a direction perpendicular to the coupling surface. For example, as illustrated in FIG. 4, a guide protrusion 1110 protruding toward the first lens module 2000 may be disposed on a portion of the upper surface of the housing 1100 contacting the first lens module 2000.

In the case of the guide protrusion 1110, a plurality of guide protrusions 1110 may be disposed. For example, as illustrated in FIG. 4, three guide protrusions 1110 may be disposed on the upper surface of the housing 1100.

The plurality of guide protrusions 1110 may have different shapes. For example, some of the guide protrusions 1111 and 1112 may be provided in a hemispherical shape, and some of the guide protrusions 1113 may be provided in a shape having a crest. However, the detailed shape of the guide protrusion is not limited to the above.

A guide groove 2220 into which the guide protrusion 1110 is inserted may be disposed on a member that comes into contact with the member on which the guide protrusion 1110 is disposed.

In the process of assembling the first lens module 2000 to the housing 1100, the guide protrusion 1110 comes into contact with the guide groove 2220, and thus guides the precise position of the first lens module 2000.

Referring to FIGS. 4 to 6, an alignment structure between the first lens module 2000 and the housing 1100 will be described in detail.

The guide protrusions 1110 and guide grooves 2220 may include first guide protrusion 1111 and first guide groove 2221, second guide protrusion 1112 and second guide groove 2222, and third guide protrusion 1113 disposed in different positions.

The guide protrusions 1110 and guide grooves 2220 may form a different number of contact points. In this case, a 'contact point' may be a contact portion (contact point) between a protrusion and a groove. The contact portion may be roughly in the form of a single point, or may have a predetermined area according to the physical properties or design curvature of the material constituting the protrusion or groove.

As illustrated in part A of FIG. 5, the first guide protrusion 1111 of the housing 1100 may contact the first guide groove 2221 of the first lens module 2000 at least three points. For example, the first guide protrusion 1111 of the housing 1100 may form at least three contact points P3 with the first lens module 2000. Accordingly, the relative position of the first guide groove 2221 with respect to the first guide protrusion 1111 may be constrained in three directions (X-axis direction, Y-axis direction, and Z-axis direction).

In this case, the first guide groove 2221 may have at least three inclined surfaces 2221a, 2221b, and 2221c inclined in different directions. Since one of the inclined surfaces 2221a, 2221b, and 2221c may come into contact with the first guide protrusion 1111 to form one or more contact points, the first guide groove 2221 may have at least three contact points.

On the other hand, as illustrated in part B of FIG. 5, the second guide protrusion 1112 of the housing 1100 may contact the second guide groove 2222 of the first lens module 2000 at least two points. For example, the second guide protrusion 1112 of the housing 1100 may form at least two contact points P2 with the first lens module 2000. Accordingly, the position of the second guide groove 2222 relative to the second guide protrusion 1112 may be constrained in two directions (Y-axis direction and Z-axis direction) to have a degree of freedom in at least one direction (X-axis direction).

In this case, the second guide groove 2222 may have at least two inclined surfaces 2222a and 2222b inclined in different directions. Since one of the inclined surfaces 2222a and 2222b may come into contact with the second guide protrusion 1112 to form one or more contact points, the second guide groove 2222 may have at least two contact points.

Also, as illustrated in part C of FIG. 5, the third guide protrusion 1113 of the housing 1100 may be in line contact or surface contact P3 with a portion of the surface of the first lens module 2000. Accordingly, the position of the partial surface relative to the third guide protrusion 1113 may be constrained in one direction (Z-axis direction).

The first guide groove 2221 and the first guide protrusion 1111 may contact each other to form a first support point of the first lens module 2000 and simultaneously provide a reference position for the first lens module 2000. The second guide groove 2222 is in contact with the second guide protrusion 1112 to form a second support point of the first lens module 2000, and at the same time, the first lens module 2000 may be restrained from rotating on an upper portion of the housing 1100 with respect to the first support point, so as not to rotate. In addition, the third guide protrusion 1113 comes into contact with a portion of the surface of the first lens module 2000 to form a third support point of the first lens module 2000, and thus, finally, the first lens module 2000 may be guided to be stably seated in an accurate position on the upper portion of the housing 1100.

The coupling structure of the first lens module 2000 may have a degree of freedom in at least one direction (e.g., the X-axis direction) at the second support point formed by the second guide protrusion 1112, and may have degrees of freedom in at least two directions (e.g., X-axis and Y-axis directions) at the third support point formed by the third guide protrusion 1113. Accordingly, even if there is a manufacturing tolerance of the guide protrusion 1110 or the guide groove 2220, the first lens module 2000 may be stably seated without being distorted or shaken.

As described above, after the first lens module 2000 is seated in the housing 1100, a process of completely fixing the position of the first lens module 2000 may be performed. For example, after the first lens module 2000 is aligned in an accurate position while the adhesive material is applied to the bonding surface, the adhesive material on the bonding surface may be cured through a UV treatment process. As the adhesive material hardens, the first lens module 2000 may be firmly fixed to the housing 1100. However, the order of these processes is not limited to the above. For example, a process of aligning the first lens module 2000 and a process of curing an adhesive material may be simultaneously performed.

The shield can 1200 disposed on the upper portion of the housing 1100 may further include a second opening 1220 avoiding the guide protrusions 1110 and guide grooves 2220.

The guide protrusions 1111 and 1112 of the housing may be exposed upward through the second opening 1220 of the shield can 1200 and come into contact with the guide grooves 2221 and 2222 of the first lens module 2000.

As the first lens module 2000 is disposed outside the housing 1100, a gap g may be present between the shield can 1200 and the first lens module 2000. For example, as illustrated in FIG. 7, the gap g may be formed at a boundary between the first lens holder 2200 of the first lens module 2000 and the shield can 1200. To prevent unnecessary external light or foreign substances from entering the housing 1100 through the gap g, the camera module 100 may further include a cover 1300 for shielding the gap (g) between the shield can 1200 and the first lens module 2000. The cover 1300 may cover the gap g between the first lens module 2000 and the housing 1100 to prevent light leakage or inflow of foreign substances. The cover 1300 may be hook-coupled with the shield can 1200 or the housing 1100, but a detailed coupling method is not limited thereto.

In addition, the cover 1300 covers at least a portion of the first lens module 2000 to protect the first lens module 2000 from external force or to protect a coupling portion between the first lens module 2000 and the housing 1100.

Hereinafter, the reflection module 3000 included in the camera module 100 will be described in detail with reference to FIGS. 8 to 10.

Figure 8:
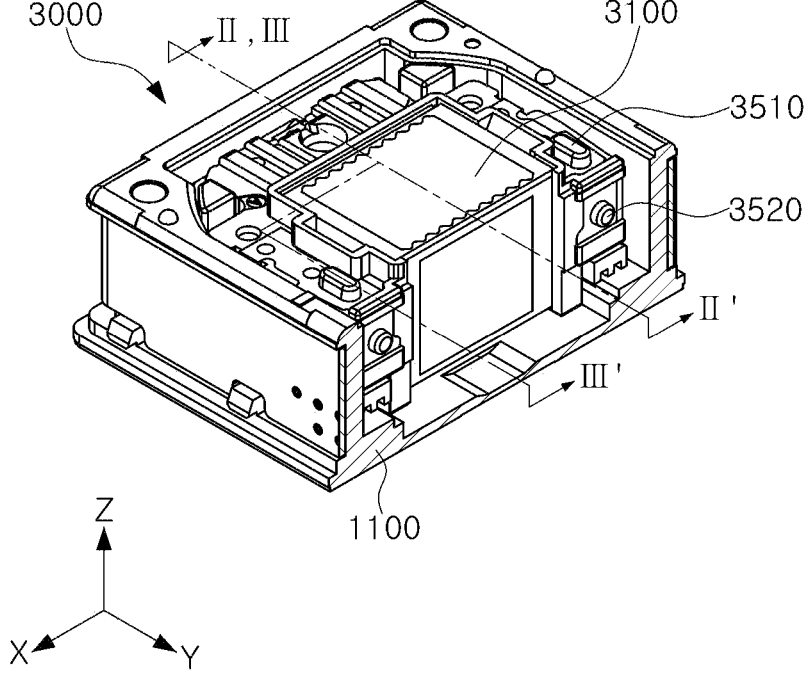
FIG. 8 is a perspective view of a reflection module.
Figure 9:
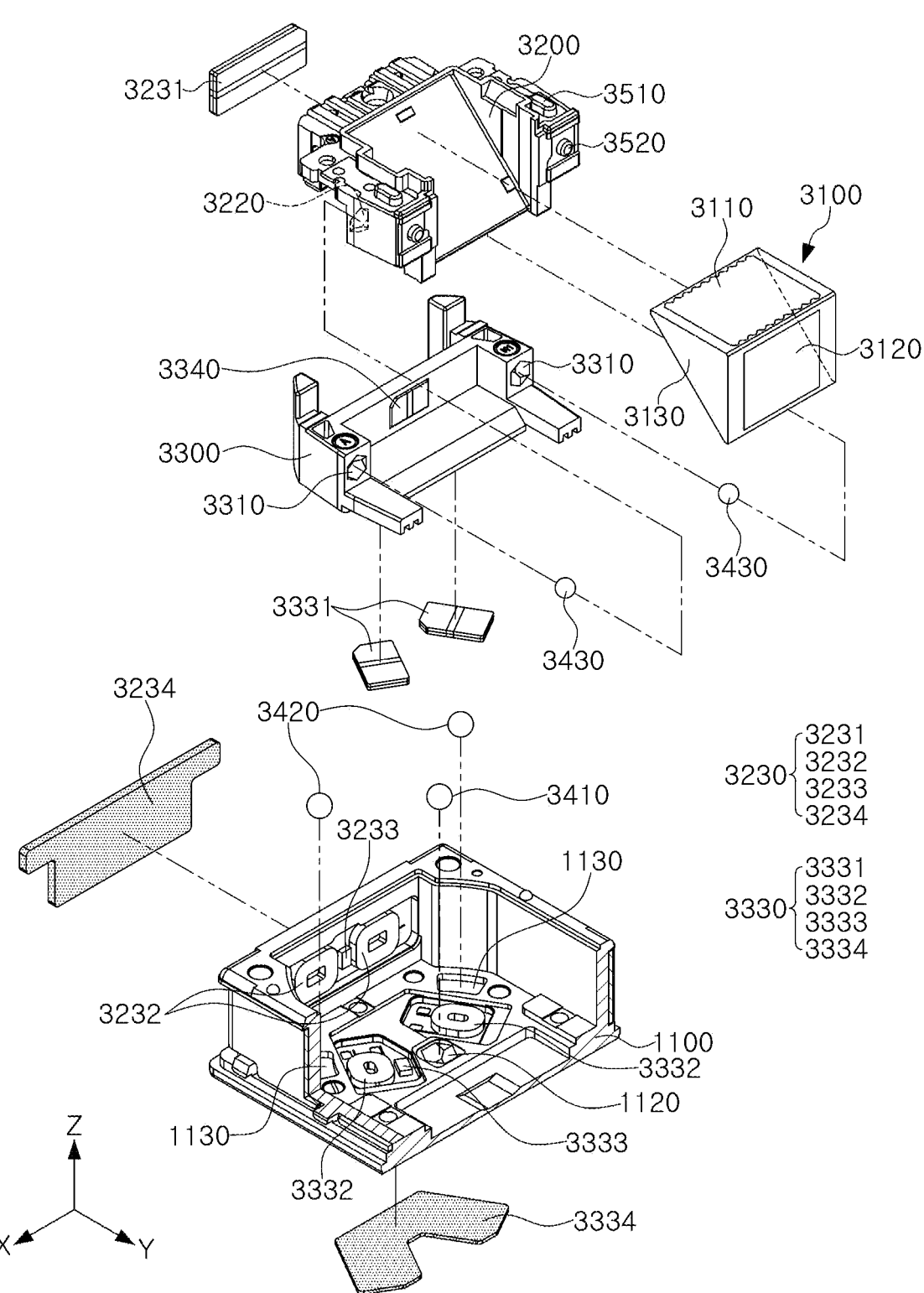
FIG. 9 is an exploded perspective view of the reflection module.

FIG. 8 is a perspective view of a reflection module. FIG. 9 is an exploded perspective view of the reflection module. FIG. 10 is a cross-sectional view of part II-II' of FIG. 8.

Since the reflection module 3000 described with reference to FIGS. 8 to 10 and the camera module 100 including the same correspond to the reflection module 3000 and the camera module 100 described above with reference to FIGS. 1 to 7, redundant descriptions may be omitted.

Referring to FIG. 8, the reflection module 3000 may be accommodated inside the housing 1100 and may include a reflective member 3100 capable of changing a light path.

The reflective member 3100 may be configured to be movable inside the housing 1100. For example, the reflective member 3100 may rotate around different rotational axes R1 and R2. The reflection module 3000 may include a first damper 3510 protruding in a first direction or a second damper 3520 protruding in a second direction different from the first direction. The dampers 3510 and 3520 of the reflection module 3000 may include a material capable of absorbing impact energy, and accordingly, may reduce shock or noise generated when the reflection module 3000 collides with the inner wall of the housing 1100 or the like.

The reflective member 3100 may include an incident surface 3110 through which light is incident from the first lens module 2000, a reflective surface 3130 through which light is reflected, and an emission surface 3120 through which reflected light is emitted. For example, light incident to the incident surface 3110 in a first direction (Z-axis direction) may be reflected from the reflective surface 3130 and emitted in a second direction (Y-axis direction). In this case, the first direction (Z-axis direction) may be a direction substantially parallel to the first optical axis O1 of the first lens module 2000, and the second direction (Y-axis direction) may be a direction substantially parallel to the second optical axis O2 of the second lens module 4000.

The reflective member 3100 may be provided in the reflective holder 3200. The reflective holder 3200 supports the reflective member 3100 and may rotate or move. For example, the reflective holder 3200 may rotate about a second rotational axis R2 passing through at least two ball members 3430, and thus the reflective member 3100 provided in the reflective holder 3200 may also rotate together.

The reflection module 3000 may further include a rotating holder 3300 that movably or rotatably supports the reflective holder 3200. The rotating holder 3300 may be configured to rotatably support the reflective holder 3200 and simultaneously rotate or move with respect to the housing 1100. For example, the reflective holder 3200 may be rotatably supported by the rotating holder 3300 with at least two ball members 3430 interposed therebetween to form a rotational axis. In addition, the rotating holder 3300 may be supported on the housing 1100 with at least one ball member 3410 interposed therebetween, and accordingly, may rotate relative to the housing 1100, around the other axis of rotation formed by the at least one ball member 3410. To distinguish respective rotational axes, in the following descriptions, the rotational axis of the rotating holder 3300 is referred to as the first rotational axis R1, and the rotational axis of the reflective holder 3200 is referred to as the second rotational axis R2.

In the reflection module 3000 according to the various examples, the first rotational axis R1 and the second rotational axis R2 may be different from each other. For example, the first rotational axis R1 and the second rotational axis R2 may be substantially perpendicular.

The first rotational axis R1 may pass through the incident surface 3110 and the reflective surface 3130 of the reflective member 3100. The second rotational axis R2 may be substantially parallel to the reflective surface 3130 of the reflective member 3100. For example, the second rotational axis R2 may be disposed on the reflective surface 3130 or may be disposed parallel to the reflective surface 3130 at a predetermined distance.

In the reflection module 3000, the first rotational axis R1 and the second rotational axis R2 may meet each other at one point. In this case, the point where the first rotational axis R1 and the second rotational axis R2 meet may be disposed on the reflective surface 3130 of the reflective member 3100 or disposed adjacent to the reflective surface 3130.

When the reflection module 3000 is in a neutral position, the incident surface 3110 of the reflective member 3100 is substantially perpendicular to the first optical axis O1 of the first lens module 2000, and the emission surface 3120 of the reflective member 3100 may be substantially perpendicular to the second optical axis O2 of the second lens module 4000. In this case, the first rotational axis R1 of the reflection module 3000 substantially coincides with the first optical axis O1, and the second rotational axis R2 of the reflection module 3000 may be perpendicular to both the first optical axis O1 and the second optical axis O2. Also, like the intersection of the first and second rotational axes R1 and R2, the intersection of the first and second optical axes O1 and O2 may be located on the reflective surface 3130 of the reflective member 3100.

The reflective holder 3200 may be supported on the rotating holder 3300 by magnetic attraction or magnetic repulsion generated by a pair of magnetic bodies 3240 and 3340. The pair of magnetic bodies 3240 and 3340 may be separately disposed in the reflective holder 3200 and the rotating holder 3300, respectively. For example, as illustrated in FIGS. 9 and 10, the pair of magnetic bodies 3240 and 3340 may be formed of a pulling yoke 3240 disposed on the reflective holder 3200 and a pulling magnet 3340 disposed on the rotating holder 3300. In this case, the pulling magnet 3340 and the pulling yoke 3240 generate magnetic attraction pulling each other, and by this magnetic attraction, the reflective holder 3200 may be supported on the rotating holder 3300 with the ball member 3430 therebetween.

However, the configuration of the pair of magnetic bodies 3240 and 3340 is not limited to the above. For example, the pulling magnet 3340 and the pulling yoke 3240 may be disposed on the reflective holder 3200 and the rotating holder 3300, respectively. Alternatively, the pair of magnetic bodies 3240 and 3340 may all be composed of magnets.

In the various examples, the reflection module 3000 may include a first driving unit 3330 driving the rotating holder 3300 and a second driving unit 3230 driving the reflective holder 3200.

The first driving unit 3330 and the second driving unit 3230 may each include a driving coil and a driving magnet. For example, the first driving unit 3330 may rotate the rotating holder 3300 by electromagnetic interaction between the first driving coil 3332 and the first driving magnet 3331 facing each other. Also, the second driving unit 3230 may rotate the reflective holder 3200 by electromagnetic interaction between the second driving coil 3232 and the second driving magnet 3231 facing each other.

In the camera module, a driving magnet and a driving coil may be disposed on two components that move relative to each other. For example, the first driving magnet 3331 may be disposed on the rotating holder 3300 and the first driving coil 3332 may be disposed on the housing 1100. The second driving magnet 3231 may be disposed on the reflective holder 3200, and the second driving coil 3232 may be disposed on the housing 1100.

The first driving unit 3330 may include a first position sensor 3333 facing the first driving magnet 3331. The first position sensor 3333 may be disposed side by side around the first driving coil 3332 or inside the first driving coil 3332. Similarly, the second driving unit 3230 may include a second position sensor 3233 facing the second driving magnet 3231. The second position sensor 3233 may be disposed side by side around the second driving coil 3232 or inside the second driving coil 3232.

At the neutral position of the reflection module 3000, each of the position sensors 3233 and 3333 may be positioned to face the neutral regions 3231*a* and 3331*a* of the driving magnets 3231 and 3331.

Hereinafter, the rotating holder 3300 included in the reflection module 3000 will be described in more detail.

The reflection module 3000 may include a rotating holder 3300 rotatable with respect to the housing 1100. The rotating holder 3300 may rotate with respect to the housing 1100 while rotatably supporting the reflective holder 3200 and the reflective member 3100. For example, the rotating holder 3300 is rotatably disposed about the first rotational axis R1, and accordingly, the reflective member 3100 also rotates along with the rotating holder 3300 about the first rotational axis R1.

Between the rotating holder 3300 and the housing 1100, a plurality of ball members 3410 and 3420 rotatably supporting the rotating holder 3300 may be disposed.

The plurality of ball members 3410 and 3420 may include a first ball member 3410 forming a rotational axis (hereinafter, a first rotational axis R1) of the rotating holder 3300, and a guide ball member 3420 that helps the stable rotation of the rotating holder 3300.

The first ball member 3410 may form the first rotational shaft R1 while rotating in place while being fixed in position with respect to the housing 1100. Accordingly, the first rotational axis R1 may pass through the first ball member 3410.

The first rotational axis R1 may substantially coincide with the first optical axis O1 of the first lens module 2000 facing the reflection module 3000. Accordingly, an imaginary line extending along the first optical axis O1 may pass through the first ball member 3410.

The first ball member 3410 may be accommodated in the first accommodating groove 1120 of the housing 1100. To fix the position of the first ball member 3410, the first receiving groove 1120 may be configured to support the first ball member 3410 at least three points. In addition, a groove 3321 facing the first accommodating groove 1120 and having the same shape may be disposed on the rotating holder 3300 as well. Accordingly, the first ball member 3410 may form the first rotation shaft R1 while rotating in place while being sandwiched between the rotating holder 3300 and the housing 1100.

One or more guide ball members 3420 may be disposed. For example, as illustrated in FIGS. 9 and 10, the reflection module 3000 may include a first ball member 3410 and two spaced apart guide ball members 3420. The guide ball member 3420 may roll with respect to the housing 1100 or the rotary holder 3300, and may support the rotary holder 3300 to rotate while maintaining a predetermined distance from the bottom surface of the housing 1100. Meanwhile, another guide groove 3322 (hereinafter referred to as a fourth guide groove) accommodating the guide ball member 3420 may be disposed on the lower surface of the rotating holder 3300. Accordingly, the guide ball member 3420 is sandwiched between the fourth guide groove 3322 of the rotary holder 3300 and the third guide groove 1130 of the housing 1100 while rolling and supporting the rotary holder 3300.

The first driving magnet 3331 and the first driving coil 3332 may face each other in a first direction (Z-axis direction). In this case, the first direction (Z-axis direction) may be a direction substantially parallel to the first rotational axis R1 that is the rotational axis of the rotating holder 3300.

The first driving coil 3332 may be disposed on the bottom surface of the housing 1100. A plurality of first driving coils 3332 may be disposed spaced apart from each other in the circumferential direction of the first rotational shaft R1, or may be configured as an integral coil having a portion extending in the circumferential direction of the first rotational shaft R1. The first driving coil 3332 may be disposed between the first ball member 3410 and the guide ball member 3420.

The first driving magnet 3331 may be disposed to face the first driving coil 3332 on the lower surface of the rotating holder 3300. The first driving magnet 3331 may be configured such that different polarities are sequentially magnetized along the rotational direction of the rotating holder 3300. For example, a surface of the first driving magnet 3331 facing the first driving coil 3332 may be configured to sequentially have an N pole, a neutral region, and an S pole along the rotational direction of the rotating holder 3300.

A plurality of first position sensors 3333 may be disposed, and a change in position of the first driving magnet 3331 may be detected more precisely by comparing signals detected by each first position sensor 3333 with each other.

The first driving unit 3330 may include a first yoke 3334 facing the first driving magnet 3331. For example, as illustrated in FIG. 9, the first yoke 3334 may be disposed to face the first drive magnet 3331 in the first direction on the rear surface of the first coil.

The first yoke 3334 may be made of a magnetic material. Accordingly, the first yoke 3334 may serve to focus lines of magnetic force generated from the first driving magnet 3331 and interact with the first driving magnet 3331 to generate magnetic attraction. Hereinafter, the magnetic force generated between the first driving magnet 3331 and the first yoke 3334 is defined as the first magnetic force.

Since the first yoke 3334 and the first driving magnet 3331 are disposed to face each other in the first direction (Z-axis direction), the first yoke 3334 moves the first driving magnet 3331 in the first direction (Z-axis direction). For example, the first yoke 3334 may serve as a pulling yoke. By the first magnetic force between the first yoke 3334 and the first driving magnet 3331, the rotating holder 3300 may be supported on the housing 1100 in the first direction (Z-axis direction).

However, the support structure of the rotating holder 3300 is not limited to the above. For example, in another example, the reflection module 3000 may further include a separate magnetic material (not illustrated) that generates magnetic attraction or magnetic repulsion together with the first yoke 3334 to support the rotating holder 3300.

The reflection module 3000 may include a reflective holder 3200 rotatable relative to the rotating holder 3300. The reflective member 3100 is fixed to the reflective holder 3200 and may rotate with respect to the rotating holder 3300. For example, the reflective holder 3200 is rotatably disposed about a second rotational axis R2 substantially perpendicular to the first rotational axis R1, and accordingly, the reflective member 3100 may also rotate along with the rotating holder 3300 about the second rotational axis R2.

A plurality of ball members 3430 guiding rotation of the reflective holder 3200 may be disposed between the reflective holder 3200 and the rotating holder 3300. For example, as illustrated in FIG. 8, between the reflective holder 3200 and the rotating holder 3300, a plurality of second ball members 3430 forming a second rotational axis R2 that is a rotational axis of the reflective holder 3200 may be disposed.

The plurality of second ball members 3430 may be spaced apart from each other in a direction perpendicular to the first rotational axis R1.

The plurality of second ball members 3430 may be spaced apart from each other in a direction perpendicular to both the first optical axis O1 of the first lens module 2000 and the second optical axis O2 of the second lens module 4000.

The plurality of second ball members 3430 may form the second rotational shaft R2 while rotating in place while their positions are fixed with respect to the reflective holder 3200 or the rotating holder 3300. The second rotational axis R2 may pass through the plurality of second ball members 3430.

The reflective member 3100 may be disposed between the second ball members 3430. In this case, a plane extending from the reflective surface 3130 of the reflective member 3100 may pass through the second ball member 3430. However, the arrangement of the reflective member 3100 is not limited to the above. For example, the reflective member 3100 may be disposed so that the reflective surface 3130 faces at least one of the second ball members 3430.

The rotating holder 3300 or the reflective holder 3200 may include accommodating grooves 3220 and 3310 capable of accommodating the second ball member 3430. For example, the rotating holder 3300 may include a second accommodating groove 3310 disposed on a surface facing the reflective holder 3200 and receiving a portion of the second ball member 3430, the reflective holder 3200 is disposed on a surface facing the rotary holder 3300, and a third accommodating groove 3220 accommodating another part of the second ball member 3430 may be disposed. The second accommodating groove 3310 of the rotating holder 3300 and the third accommodating groove 3220 of the reflective holder 3200 may face each other in a second direction (Y-axis direction). Corresponding to the number of second ball members 3430, a plurality of second accommodating grooves 3310 and third accommodating grooves 3220 may be disposed.

The second driving magnet 3231 and the second driving coil 3232 may face each other in the second direction (Y-axis direction). In this case, the second direction (Y-axis direction) may be substantially parallel to the second optical axis O2 that is the optical axis of the second lens module 4000. Alternatively, the second direction (Y-axis direction) may be substantially perpendicular to the first rotational axis R1 that is the rotational axis of the rotating holder 3300.

Different polarities of the second driving magnet 3231 may be sequentially magnetized along the rotation direction of the reflective holder 3200. For example, the second driving magnet 3231 may be sequentially magnetized to have an N pole, a neutral region, and an S pole along the rotational direction of the reflective holder 3200.

The second driving coil 3232 may be disposed to face the second driving magnet 3231 on the sidewall of the housing 1100. A second yoke 3234 may be disposed on a rear surface of the second driving coil 3232 so that lines of magnetic force generated from the second driving magnet 3231 pass through the second driving coil 3232 more intensively. The second yoke 3234 is made of a magnetic material and may focus lines of magnetic force generated from the second driving magnet 3231.

A plurality of second position sensors 3233 may be disposed, and a change in position of the second driving magnet 3231 may be detected more precisely by comparing signals detected by each second position sensor 3233 with each other. When a plurality of second position sensors 3233 are disposed, at least two second position sensors 3233 may be disposed side by side along a direction perpendicular to the second rotational axis R2.

The reflective holder 3200 may be supported on the rotating holder 3300 by magnetic force (hereinafter, referred to as a second magnetic force) generated from the pair of magnetic bodies 3240 and 3340. The pair of magnetic bodies 3240 and 3340 may include a first magnetic body 3240 fixed to the reflective holder 3200 and a second magnetic body 3340 that magnetically interacts with the first magnetic body 3240.

In the various examples, the first magnetic body 3240 may be a pulling yoke disposed on the reflective holder 3200, and the second magnetic body 3340 may be a pulling magnet disposed on the rotating holder 3300. By the magnetic attraction between the pulling magnet 3340 and the pulling yoke 3240, the reflective holder 3200 may be supported on the rotating holder 3300 with the second ball member 3430 interposed therebetween. In this case, the pulling magnet 3340 may be a separate magnet distinguished from the second driving magnet 3231 of the second driving unit 3230. For example, as illustrated in FIG. 9 or 10, a pulling magnet 3340 may be disposed on the rotating holder 3300 separately from the second driving magnet 3231 disposed on the reflective holder 3200. In this way, a more accurate and stable support structure may be formed by separately providing the driving magnet and the pulling magnet.

In the reflection module 3000, the pulling magnet 3340 and the pulling yoke 3240 may be disposed to face each other in the second direction (Y-axis direction). The second direction (Y-axis direction) is a direction perpendicular to the first direction (Z-axis direction) in which the first driving magnet 3331 and the first driving coil 3332 of the rotating holder 3300 face each other. As the pulling magnet 3340 and the pulling yoke 3240 face each other in the second direction (Y-axis direction), the reflective holder 3200 moves the rotating holder 3300 in the second direction (Y-axis direction) by the second magnetic force.

Figure 10:
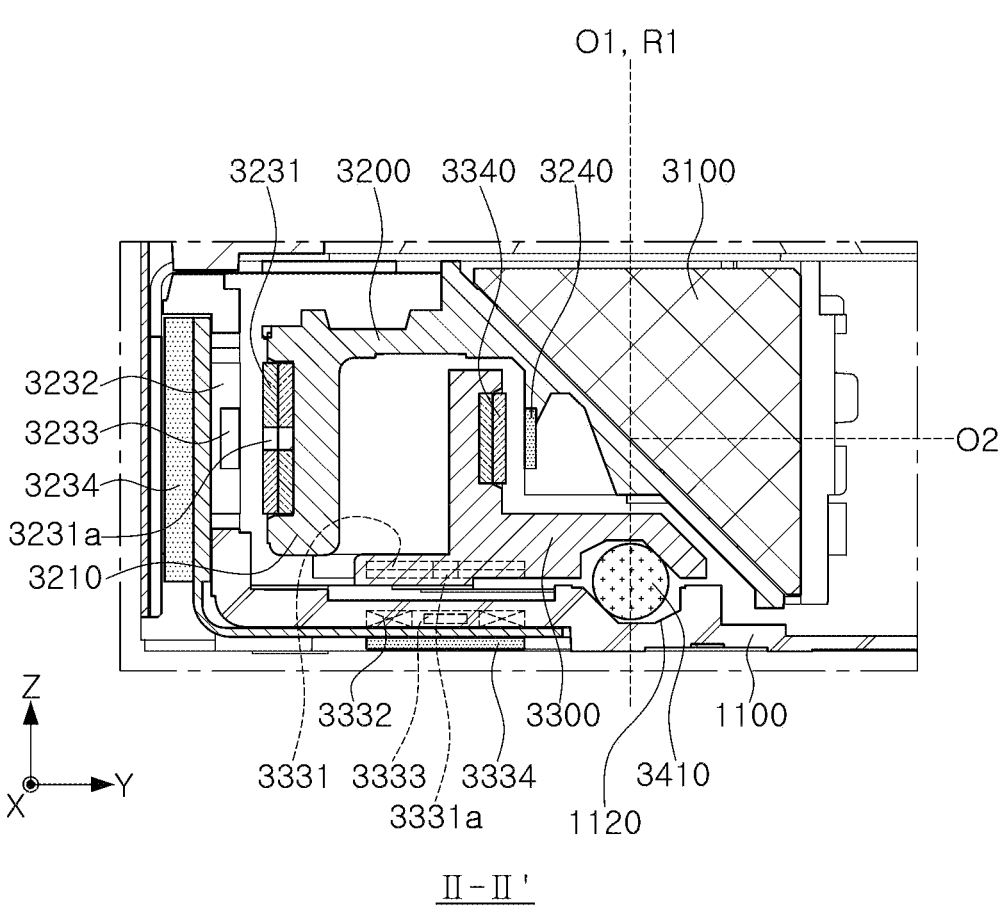
FIG. 10 is a cross-sectional view of part II-II' of FIG. 8.

Referring to FIG. 10, the second driving magnet 3231 and the pulling magnet 3340 may be spaced apart from each other. The reflective holder 3200 may have an extension 3210 extending between the rotating holder 3300 and the housing 1100, and the second driving magnet 3231 may be disposed on the extension 3210. Accordingly, the second driving magnet 3231 may be disposed as close as possible to the second driving coil 3232 by avoiding the pulling magnet 3340 of the rotary holder 3300. In addition, according to this structure, the second driving magnet 3231 may directly face the second driving coil 3232 in the second direction (Y-axis direction), and at the same time, the pulling magnet 3340 and the pulling yoke 3240 may also face directly in the second direction (Y-axis direction).

The second driving magnet 3231 may be disposed between the pulling magnet 3340 and the second driving coil 3232. For example, as illustrated in FIG. 10, a second driving magnet 3231 may be disposed at a portion of the extension 3210 of the reflective holder 3200 facing the housing 1100.

However, the support structure of the reflective holder 3200 is not limited to the above. For example, in another example, the pulling magnet 3340 and the pulling yoke 3240 are disposed to face each other in the second direction (Y-axis direction), and the second driving magnet 3231 is the reflective holder 3200. It may be disposed on the side and face the second driving coil 3232 disposed on the housing 1100 in a third direction (X-axis direction). In this case, the third direction (X-axis direction) may be a direction perpendicular to both the first direction (Z-axis direction) and the second direction (Y-axis direction). Also, the third direction (X-axis direction) may be substantially parallel to the second rotational axis R2 of the reflective holder 3200.

Hereinafter, the second lens module 4000 included in the camera module 100 will be described with reference to FIGS. 11 to 14.

Figure 11:
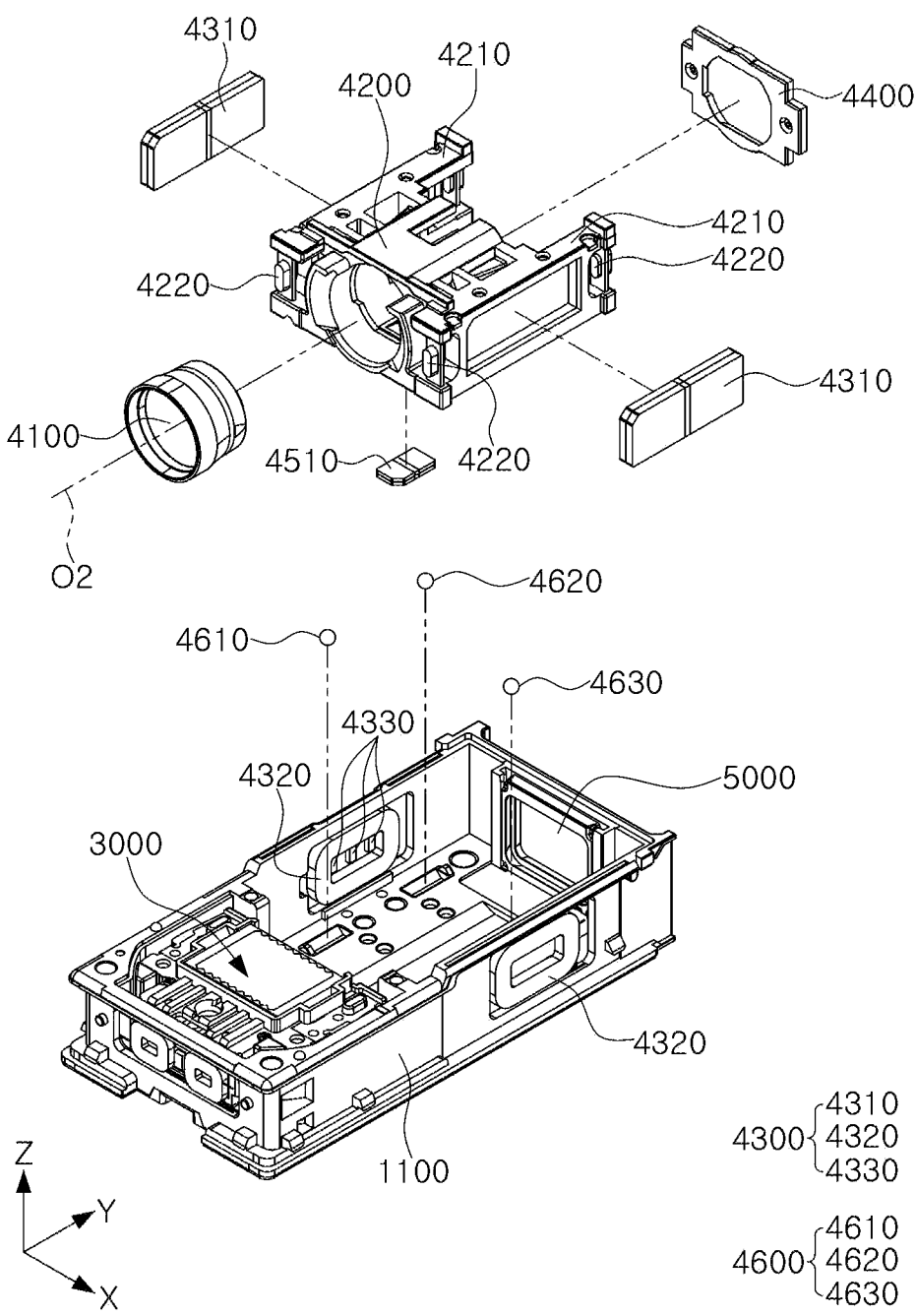
FIG. 11 is an exploded perspective view of the second lens module.
Figure 13:
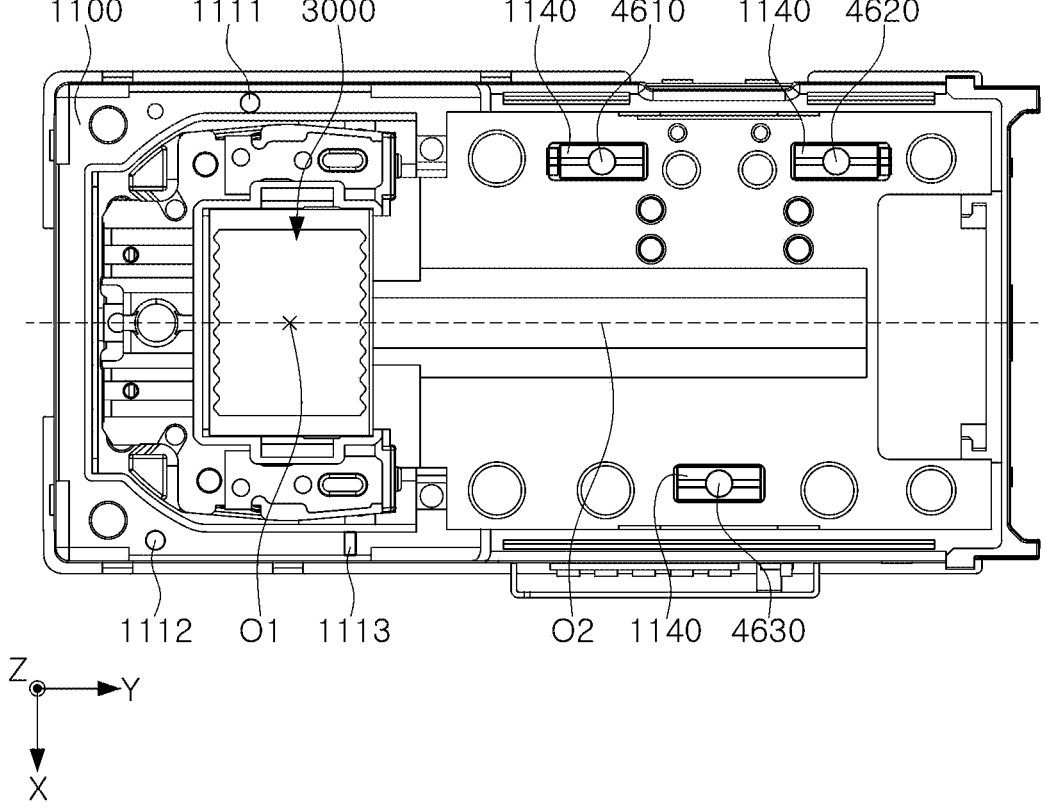
FIG. 13 is a reference view for illustrating the arrangement of a guide portion for guiding a position of a first lens module and a ball member for guiding a movement of a second lens module.

FIG. 11 is an exploded perspective view of the second lens module. 12 is a reference view exemplarily illustrating a state in which a second lens module is accommodated in a housing. FIG. 13 is a reference view for illustrating the arrangement of a guide portion for guiding a position of a first lens module and a ball member for guiding a movement of a second lens module. 14 is a reference diagram for illustrating the coupling of the housing and the circuit board.

The second lens module 4000 described with reference to FIGS. 11 to 14 and the camera module 100 including the same correspond to the second lens module 4000 and the camera module 100 described above with reference to FIGS. 1 to 11, and thus, redundant descriptions may be omitted.

The camera module 100 may include a second lens module 4000 through which light emitted from the reflection module 3000 passes. The second lens module 4000 is received inside the housing 1100 and may include one or more lenses 4100 disposed along the second optical axis O2. Light emitted from the reflection module 3000 may be refracted by the lens 4100 of the second lens module 4000 and may be incident to the image sensor 5000 behind the second lens module 4000.

Referring to FIG. 11, the second lens module 4000 may include one or more lenses 4100, a second lens holder 4200 supporting the lens 4100, and a third driving unit 4300 generating a driving force capable of moving the second lens holder 4200 relative to the housing 1100. The lens 4100 of the second lens module 4000 may move in a direction parallel to the second optical axis O2 by the third driving unit 4300. However, the configuration of the second lens module 4000 is not limited to that illustrated in the drawings. For example, the second lens module 4000 may include a plurality of sub-lens modules each containing one or more lenses. The sub-lens modules may be configured to move independently of each other in a direction parallel to the second optical axis O2.

The third driving unit 4300 may include a third driving magnet 4310 and a third driving coil 4320 facing each other, and a third position sensor 4330 that senses a movement amount of the third driving magnet 4310.

Referring to FIG. 11, a third driving magnet 4310 may be disposed in the second lens holder 4200 of the second lens module 4000, and a third driving coil 4320 may be disposed in the housing 1100. The third driving coil 4320 and the third driving magnet 4310 may face each other in a direction perpendicular to the second optical axis O2. Due to the electromagnetic interaction between the third driving coil 4320 and the third driving magnet 4310, the second lens holder 4200 may move in a direction parallel to the second optical axis O2.

A surface of the third driving magnet 4310 facing the third driving coil 4320 may be configured such that different polarities are sequentially magnetized along the moving direction of the second lens module 4000.

The third position sensor 4330 may be disposed inside or outside the third driving coil 4320 to face the third driving coil 4320. The third position sensor 4330 may be a magnetic sensor. For example, the third position sensor 4330 may include a hall sensor. A plurality of third position sensors 4330 may be disposed. For example, a plurality of third position sensors 4330 may be disposed side by side in the moving direction of the second lens module 4000 inside the third driving coil 4320.

The second lens module 4000 may include a plurality of ball members 4600 disposed between the second lens holder 4200 and the housing 1100. For example, as illustrated in FIGS. 11 and 12, three ball members 4610, 4620, and 4630 may be disposed between the second lens holder 4200 and the housing 1100, and accordingly, the second lens holder 4200 may move smoothly inside the housing 1100.

The plurality of ball members 4600 may include a third ball member 4610, a fourth ball member 4620, and a fifth ball member 4630 that are spaced apart from each other.

Guide grooves 1140, 4231, and 4232 may be disposed in the second lens holder 4200 and the housing 1100 so that the plurality of ball members 4600 may be accommodated and moved by rolling.

The guide grooves 1140, 4231, and 4232 of the second lens holder 4200 and the housing 1100 may each extend in a direction parallel to the second optical axis O2. At least some of the plurality of ball members 4600 may be disposed along a direction parallel to the second optical axis O2. For example, the third ball member 4610 and the fourth ball member 4620 may be disposed on the bottom surface of the housing 1100 in a direction parallel to the second optical axis O2, and the fifth ball member 4630 may be disposed on the opposite side of the third ball member 4610 and the fourth ball member 4620 based on the second optical axis O2. Accordingly, the second lens holder 4200 may slide easily in the direction of the second optical axis O2 while being stably supported on the lower surface of the housing 1100.

Cross sections of the guide grooves 1140, 4231, and 4232 of the second lens holder 4200 and the housing 1100 may have various shapes as needed.

For example, the guide groove 1140 (hereinafter, referred to as a fifth guide groove) of the housing may have a V-shaped cross section or a U-shaped cross section so as to form two contact points with the ball members 4600. When the fifth guide groove 1140 has such a cross-sectional shape, the ball members 4600 may roll while maintaining a constant distance from the second optical axis O2.

In addition, some of the guide grooves of the second lens holder 4200 (4231, hereinafter referred to as a sixth guide groove) may form two contact points with the third ball member 4610 and the fourth ball member 4620, respectively. The other part (4232, hereinafter referred to as the seventh guide groove) may have a flat cross-sectional shape to form only one contact point with the fifth ball member 4630. In the case of this structure, the sixth guide groove 4231 may serve to guide the exact position of the second lens holder 4200. In addition, the seventh guide groove 4232 has a flat cross-sectional shape, and serves to prevent the ball member 4600 from falling off between the second lens holder 4200 and the housing 1100 due to assembly tolerances or the like.

Due to the structure of the guide grooves 1140, 4231, and 4232, simply inserting the ball member 4600 into the guide groove 1140 of the housing and disposing the second lens holder 4200 on the second lens is sufficient. The second optical axis O2 of the module 4000 may be aligned in an accurate position.

In addition, the guide grooves 1140, 4231, and 4232 and the ball member 4600 are mutually combined with the guide portions 1110 and 2220 described above with reference to FIGS. 4 to 6 to form the first lens module 2000. The optical axis O1 and the second optical axis O2 of the second lens module 4000 may be guided to accurately cross each other.

For example, the guide portion 1110 guides the first lens module 2000 to be coupled to an accurate position on the upper surface of the housing so that the first optical axis O1 may be aligned in the correct position, and the guide grooves 1140 and 4231 And through the assembly structure of the ball members 4610 and 4620, the second lens module 4000 may be guided to be accommodated in an accurate position inside the housing to align the second optical axis O2 in the correct position. Therefore, the manufacturer precisely controls the production of the guide portion 1110 and the guide grooves 1140 and 4231, and the first optical axis O1 of the first lens module 2000 and the second optical axis O1 of the second lens module 4000 It may be manufactured so that the optical axes O2 exactly cross each other, and it is possible to implement a camera module having a precise resolution while having a simple structure.

A plurality of dampers 4220 may be disposed in the second lens holder 4200 to prevent the second lens module 4000 from colliding with the inner surface of the housing 1100 and generating shock and noise while the second lens module 4000 is moving.

The second lens module 4000 may further include a light blocking member 4400 to prevent flare. The light blocking member 4400 may be a frame-shaped member disposed on a surface of the second lens holder 4200 facing the image sensor 5000, and blocks unnecessary light passing through the second lens module 4000 to prevent flare. The phenomenon may be prevented.

The second lens holder 4200 may have an extension 4210 that extends backward. To make the stroke of the second lens module 4000 long, some guide grooves 4230 extend along the extension 4210.

The second lens module 4000 may be supported in a direction perpendicular to the second optical axis O2 by magnetic force generated from the pair of magnetic bodies 4510 and 4520.

Figure 12:
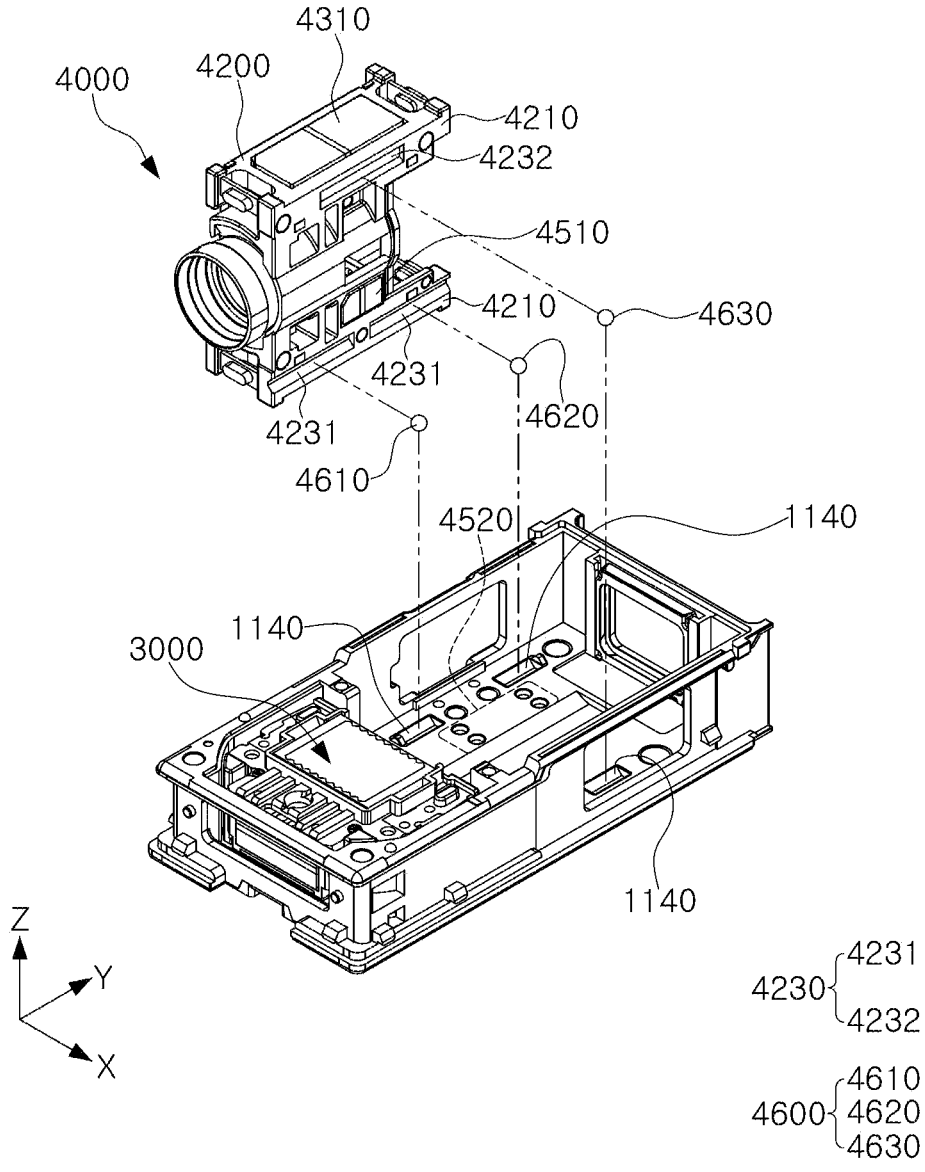
FIG. 12 is a reference view exemplarily illustrating a state in which a second lens module is accommodated in a housing.

Referring to FIG. 12, a third magnetic body 4510 may be disposed on the lower surface of the second lens holder 4200, and a fourth magnetic body 4520 facing the third magnetic body 4510 may be disposed in the housing 1100. One of the third magnetic body 4510 and the fourth magnetic body 4520 may be a pulling magnet, and the other may be a pulling yoke.

By the magnetic attraction (hereinafter referred to as the third magnetic force) generated between the third magnetic body 4510 and the fourth magnetic body 4520, the second lens holder 4200 may move while being in close contact with the bottom surface of the housing 1100 with the plurality of ball members 4600 interposed therebetween. To stably support the second lens holder 4200, the third magnetic body 4510 may be disposed inside a support area formed by the plurality of ball members 4600. For example, the second lens holder 4200 may have three support points each formed by three ball members 4610, 4620, and 4630, and thus a triangular support area having these three support points as vertices. The third magnetic body 4510 may be disposed inside a support area formed by the plurality of ball members 4600. Accordingly, the second lens holder 4200 may be stably supported by the housing 1100.

For stable support of the second lens holder 4200, the third magnetic body 4510 may be disposed close to the third ball member 4610 or the fourth ball member 4620. For example, the distance between the third magnetic body 4510 and the third ball member 4610 or the distance between the third magnetic body 4510 and the fourth ball member 4620 is between the third magnetic body 4510 and the fifth ball member 4630 may be smaller than the distance between them. Accordingly, even if the second lens holder 4200 moves with a long stroke, the point of application of the third magnetic force may stably stay inside the support area, so that the second lens holder 4200 is stably supported inside the housing 1100.

In the camera module 100, the driving coils 3232, 3332, and 4320 that move the reflective member 3100 and the second lens holder 4200 may be connected to the circuit board 7000 and exposed to the internal space of the housing 1100. For example, referring to FIG. 14, the first driving coil 3332, the second driving coil 3232, and the third driving coil 4320 may be disposed on a circuit board 7000, and may be exposed to the internal space of the housing 1100 through the openings 1151, 1152, and 1153 of the housing 1100.

Figure 14:
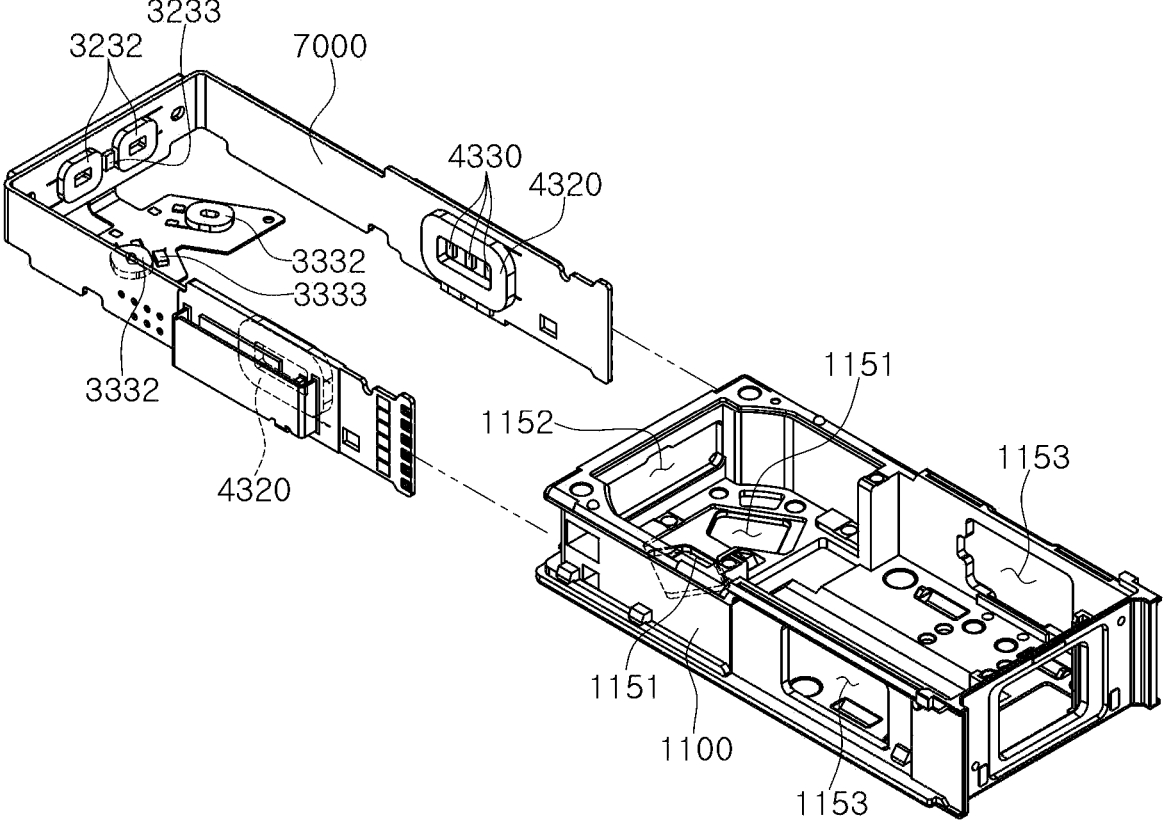
FIG. 14 is a reference diagram for illustrating a coupling between a housing and a circuit board.

As illustrated in FIG. 14, the first driving coil 3332, the second driving coil 3232, and the third driving coil 4320 may all be connected to the same circuit board 7000, but are not limited thereto, and may be connected to different circuit boards and exposed to the internal space of the housing 1100.

As set forth above, a camera module according to the various examples may implement a high zoom magnification by including a plurality of lens modules and a reflection module.

The camera module according to the various examples has a structure in which a plurality of lens modules may be quickly and accurately assembled, thereby implementing relatively high resolution.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a first lens module including one or more lenses disposed along a first optical axis;
a housing defining an internal space;
at least two guide protrusions disposed in the internal space and configured to guide a coupling position of the first lens module; and
a reflective member disposed in the internal space and configured to change a traveling path of light incident along the first optical axis,
wherein the at least two guide protrusions include a first guide protrusion contacting the first lens module to form a first number of contact points and a second guide protrusion contacting the first lens module to form a second number of contact points different from the first number of contact points.

2. The camera module of claim 1, wherein the first guide protrusion forms at least three contact points with the first lens module, and
the second guide protrusion forms at least two contact points with the first lens module.

3. The camera module of claim 2, wherein the first guide protrusion and the second guide protrusion protrude from the housing toward the first lens module.

4. The camera module of claim 3, wherein the first lens module includes a first guide groove contacting the first guide protrusion and a second guide groove contacting the second guide protrusion.

5. The camera module of claim 4, wherein the first guide groove has at least three inclined surfaces inclined with respect to the first optical axis in different directions from each other, and
the second guide groove has at least two inclined surfaces inclined with respect to the first optical axis in different directions from each other.

6. The camera module of claim 1, further comprising a second lens module accommodated in the housing and having a second optical axis, which intersects the first optical axis.

7. The camera module of claim 6, further comprising a plurality of ball members disposed between the second lens module and the housing,
wherein the housing includes a plurality of third guide grooves in which the plurality of ball members are respectively accommodated.

8. The camera module of claim 7, wherein the second lens module includes a fourth guide groove and a fifth guide groove respectively facing the plurality of third guide grooves,
the fourth guide groove forms at least two contact points with at least one of the plurality of ball members, and
the fifth guide groove forms at least one contact point with at least one of the plurality of ball members.

9. The camera module of claim 1, further comprising a shield can coupled to the housing and covering the internal space of the housing,
wherein the shield can includes a first opening through which light emitted from the first lens module passes.

10. The camera module of claim 9, wherein the first guide protrusion and the second guide protrusion protrude from the housing toward the first lens module, and the shield can includes a second opening that does not coincide with the first guide protrusion and the second guide protrusion.

11. The camera module of claim 9, further comprising a cover covering a gap between the shield can and the first lens module.

12. The camera module of claim 6, wherein the reflective member includes:
a rotating holder configured to rotate about a first rotational axis parallel to the first optical axis, and
the reflective member is supported by the rotating holder and configured to rotate about a second rotational axis, which is perpendicular to the first rotational axis.

13. The camera module of claim 12, wherein the reflective member includes a reflective surface configured to reflect the light incident along the first optical axis, and
the first optical axis and the second optical axis are configured to cross each other on the reflective surface.

14. A camera module comprising:
a first lens module including one or more lenses disposed along a first optical axis;
a reflective member configured to change a path of light passing through the first lens module;
a housing in which the reflection module is accommodated; and
a plurality of guide grooves disposed in either the first lens module or the housing and configured to guide a coupling position of the first lens module,
wherein the plurality of guide grooves include:
a first guide groove having at least three inclined surfaces inclined with respect to the first optical axis in different directions from each other; and
a second guide groove having at least two inclined surfaces inclined with respect to the first optical axis in different directions from each other.

15. The camera module of claim 14, further comprising a plurality of guide protrusions disposed on the other one of the first lens module or the housing and contacting the first guide groove and the second guide groove.

16. The camera module of claim 14, further comprising a second lens module including one or more lenses disposed along a second optical axis, which intersects the first optical axis,
wherein the first lens module is coupled to an upper surface of the housing, and the second lens module is accommodated in the housing.

17. A camera module comprising:
a first lens module including one or more lenses disposed along a first optical axis;
a housing defining an internal space; and
at least two guide protrusions disposed in the internal space and configured to guide a coupling position of the first lens module; and
wherein the at least two guide protrusions include a first guide protrusion contacting the first lens module to form a first number of contact points and a second guide protrusion contacting the first lens module to form a second number of contact points different from the first number of contact points, and
wherein the first guide protrusion forms at least three contact points with the first lens module, and the second guide protrusion forms at least two contact points with the first lens module.

* * * * *